United States Patent
Hosur et al.

(10) Patent No.: US 7,864,661 B2
(45) Date of Patent: Jan. 4, 2011

(54) TIME-SWITCHED PREAMBLE GENERATOR, METHOD OF GENERATING AND MULTIPLE-INPUT, MULTIPLE-OUTPUT COMMUNICATION SYSTEM EMPLOYING THE GENERATOR AND METHOD

(75) Inventors: Srinath Hosur, Plano, TX (US); Srikanth Gummadi, Rohnert Park, CA (US); Anuj Batra, Dallas, TX (US); David P. Magee, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2137 days.

(21) Appl. No.: 10/755,603

(22) Filed: Jan. 12, 2004

(65) Prior Publication Data
US 2005/0153723 A1 Jul. 14, 2005

(51) Int. Cl.
*H04J 11/00* (2006.01)
(52) U.S. Cl. .................. 370/210; 370/203; 370/208; 370/292
(58) Field of Classification Search .......... 370/208, 370/334, 347, 103, 310, 505, 338, 203, 204, 370/205, 206, 207, 210, 430, 480–482, 329, 370/512, 513; 575/299, 347, 349, 267; 455/132, 455/296, 135, 303, 101–103; 342/375, 383; 375/146, 206, 355, 267, 144, 148, 299, 347, 375/349
See application file for complete search history.

(56) References Cited

U.S. PATENT DOCUMENTS

| | | | | |
|---|---|---|---|---|
| 6,788,661 B1* | 9/2004 | Ylitalo et al. | ................ | 370/334 |
| 7,110,350 B2* | 9/2006 | Li et al. | ................ | 370/204 |
| 2002/0057750 A1* | 5/2002 | Nakao et al. | ................ | 375/345 |
| 2004/0136464 A1* | 7/2004 | Suh et al. | ................ | 375/260 |
| 2004/0235511 A1* | 11/2004 | Nakao | ................ | 455/522 |
| 2005/0111449 A1* | 5/2005 | Moorti et al. | ................ | 370/389 |
| 2005/0190848 A1* | 9/2005 | Kiyanagii et al. | ................ | 375/260 |

* cited by examiner

*Primary Examiner*—Dominic E Rego
(74) *Attorney, Agent, or Firm*—Steven A. Shaw; W. James Brady; Frederick J. Telecky, Jr.

(57) ABSTRACT

The present invention is directed to a time-switched preamble generator and method of generating a time-switched preamble for use with a multiple-input, multiple-output (MIMO) transmitter employing first and second transmit antennas. In one embodiment, the time-switched preamble generator includes an initial preamble formatter configured to provide a first preamble to the first transmit antenna and a second preamble to the second transmit antenna during an initial time interval. The time-switched preamble generator also includes a subsequent preamble formatter coupled to the initial preamble formatter and configured to provide the second preamble to the first transmit antenna and the first preamble to the second transmit antenna during a subsequent time interval.

24 Claims, 4 Drawing Sheets

TIME-SWITCHED PREAMBLE GENERATOR, METHOD OF GENERATING AND MULTIPLE-INPUT, MULTIPLE-OUTPUT COMMUNICATION SYSTEM EMPLOYING THE GENERATOR AND METHOD

TECHNICAL FIELD OF THE INVENTION

The present invention is directed, in general, to communication systems and, more specifically, to a time-switched preamble generator, a method of generating a time-switched preamble and a multiple-input, multiple-output (MIMO) transmitter employing the generator and method. The generator and method may be employed for channel estimation.

BACKGROUND OF THE INVENTION

Several standards have been established to provide uniformity and support growth in the development of wireless networks. One such standard that has been promulgated by the Institute of Electrical and Electronic Engineers (IEEE) is IEEE 802.11, which is incorporated herein by reference in its entirety. IEEE 802.11 is an umbrella standard that encompasses a family of specifications pertaining to wireless communication. Generally, IEEE 802.11 specifies an over-the-air interface between a wireless client and a base station or between two wireless clients.

There are several specifications within the IEEE 802.11 family covering topics such as different transmission rates, encoding schemes and frequency bands for transmitting data wirelessly. For example, IEEE 802.11(a) is an extension of IEEE 802.11 that specifically addresses wireless local area networks (WLANs) having a data rate up to 54 Mbps and employing a carrier frequency of 2.4 GHz. IEEE 802.11(a) specifies for such WLANs an orthogonal frequency division multiplexing (OFDM) encoding scheme for the vectors of symbol information.

Employing multiple-input, multiple-output (MIMO) communication systems is another area that supports growth in the development of wireless networks. MIMO communication systems have been shown to provide improvements in capacity and reliability over single-input single-output (SISO) communication systems. These MIMO communication systems commonly employ a block structure wherein a MIMO transmitter (which is a cooperating collection of single-dimension transmitters) sends a vector of symbol information. This symbol vector may represent one or more coded or uncoded SISO data symbols. A MIMO receiver (which is a cooperating collection of single-dimension receivers) receives one or more copies of this transmitted vector of symbol information. The performance of the entire communication system hinges on the ability of the receiver to find reliable estimates of the symbol vector that the transmitter transmitted.

A 2×2 MIMO communication system may transmit two independent and concurrent signals, employing two single-dimension transmitters having separate transmit antennas and two single-dimension receivers having separate receive antennas. Alternatively, the antennas could be derived from a single physical antenna that appropriately employs polarization. Two receive signals $Y1(k)$, $Y2(k)$ on the $k^{th}$ sub-carrier/tone following a Fast Fourier Transformation and assuming negligible inter-symbol interference may be written as:

$$Y1(k)=H11(k)*X1(k)+H12(k)*X2(k)+n1(k)$$

$$Y2(k)=H21(k)*X1(k)+H22(k)*X2(k)+n2(k)$$

where $X1(k)$ and $X2(k)$ are two independent signals transmitted on the $k^{th}$ sub-carrier/tone from the first and second transmit antennas, respectively, and n1 and n2 are noises associated with the two receive signals. The term Hij(k), where i=1, 2 and j=1, 2, incorporates gain and phase distortion associated with symbols transmitted on the $k^{th}$ sub-carrier/tone from transmit antenna j to receive antenna i. The channel gain and phase terms Hij(k) may also include gain and phase distortions due to signal conditioning stages such as filters and other analog electronics. The receiver requires the channel values Hij(k) to reliably decode the transmitted signals $X1(k)$ and $X2(k)$.

In order to estimate the channel coefficients Hij(k) at the receiver, the transmitter and the receiver employ training sequences. These training sequences are predetermined and known at both the transmitter and the receiver. In IEEE 802.11(a), a training sequence, called a long sequence, is employed as part of a preamble to the transmission of data. This long sequence involves the transmission of a known sequence of vector symbols, employing 52 excited tones (1 or −1) and an unexcited tone (0) both at DC and at each end of the spectrum, to provide a guard interval that is used to protect data tones from pass band filter effects.

An appropriate calculation of individual channel coefficients $H11(k)$, $H12(k)$, $H21(k)$, $H22(k)$ may typically require a processor employing complex computations. Alternatively, employing a conventional orthogonal preamble may reduce computational complexity. However, this operation typically extends the length of the training session and thereby increases system operating overhead. Therefore, a first trade-off may exist in achieving a reliable channel estimate between the quality of channel estimation and the cost related to computational complexity. And, a second trade-off may also exist in accommodating increased operating overhead.

Accordingly, what is needed in the art is a way to accomplish channel estimation by providing a reduction in computational complexity without increasing operating overhead.

SUMMARY OF THE INVENTION

To address the above-discussed deficiencies of the prior art, the present invention is directed to a time-switched preamble generator for use with a multiple-input, multiple-output (MIMO) transmitter employing first and second transmit antennas. In one embodiment, the time-switched preamble generator includes an initial preamble formatter configured to provide a first preamble to the first transmit antenna and a second preamble to the second transmit antenna during an initial time interval. The time-switched preamble generator also includes a subsequent preamble formatter coupled to the initial preamble formatter and configured to provide the second preamble to the first transmit antenna and the first preamble to the second transmit antenna during a subsequent time interval.

In another aspect, the present invention provides a method of generating a time-switched preamble for use with a multiple-input, multiple-output (MIMO) transmitter employing first and second transmit antennas. The method includes providing a first preamble to the first transmit antenna and a second preamble to the second transmit antenna during an initial time interval. The method also includes further providing the second preamble to the first transmit antenna and the first preamble to the second transmit antenna during a subsequent time interval.

The present invention also provides, in yet another aspect, a multiple-input, multiple-output (MIMO) communication system. The MIMO communication system employs first and second transmitters having first and second transmit antennas, respectively, and includes a time-switched preamble generator that is coupled to the first and second transmitters. The time-switched preamble generator has an initial preamble formatter that provides a first preamble to the first transmit antenna and a second preamble to the second transmit antenna during an initial time interval. The time-switched preamble generator also has a subsequent preamble formatter, coupled to the initial preamble formatter, that provides the second preamble to the first transmit antenna and the first preamble to the second transmit antenna during a subsequent time interval. The MIMO communication system further employs first and second receivers, associated with the first and second transmitters, having first and second receive antennas, respectively.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
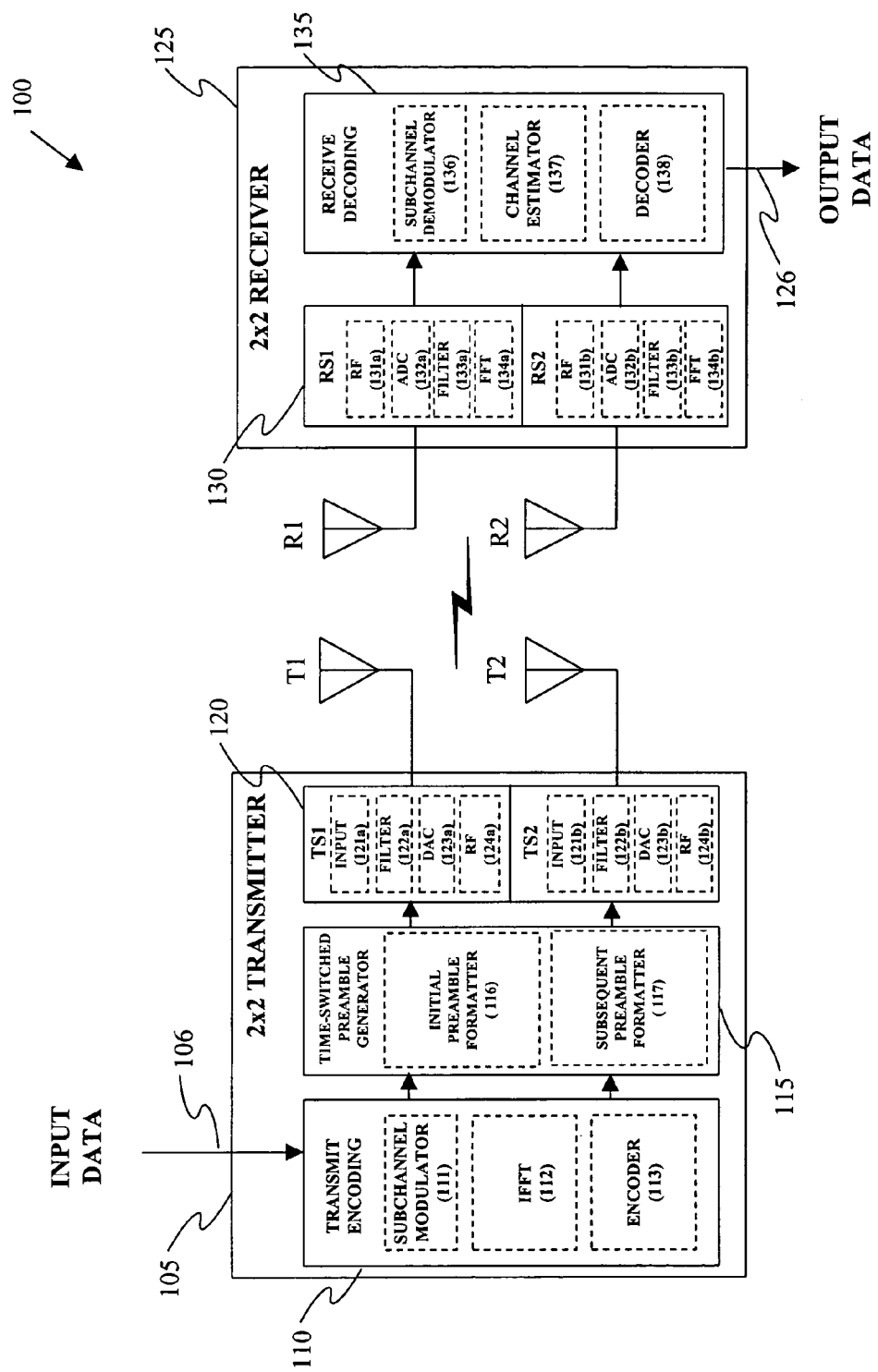
FIG. 1 illustrates a system diagram of an embodiment of a 2×2 MIMO communication system constructed in accordance with the principles of the present invention.

Referring initially to FIG. 1, illustrated is a system diagram of an embodiment of a 2×2 MIMO communication system, generally designated 100, constructed in accordance with the principles of the present invention. The MIMO communication system 100 includes a transmitter 105 and a receiver 125. The transmitter 105 includes input data 106, a transmit encoding system 110, a time-switched preamble generator 115 and a transmit system 120 having first and second transmit sections TS1, TS2 coupled to first and second transmit antennas T1, T2, respectively. The receiver 125 includes a receive system 130 having first and second receive sections RS1, RS2 respectively coupled to first and second receive antennas R1, R2, and a receive decoding system 135 providing output data 126.

The transmit encoding system 110 includes a subchannel modulator 111, an Inverse Fast Fourier Transform (IFFT) section 112 and an encoder 113. The subchannel modulator 111, IFFT section 112 and encoder 113 prepare the input data and support the arrangement of preamble information and signal information for transmission by the transmit system 120. The time-switched preamble generator 115 includes an initial preamble formatter 116 and a subsequent preamble formatter 117, which cooperate with the encoder 113, to generate a preamble so that the receiver 125 can estimate a communication channel needed to process the transmission. Additionally, the initial and subsequent preamble formatters 116, 117 may be employed in either the frequency or time domain. For the time domain, an IFFT of the appropriate preamble information may be pre-computed and read from memory at the required transmission time.

The first and second transmit sections TS1, TS2 include first and second input sections 121a, 121b, first and second filters 122a, 122b, first and second digital to analog converters (DACs) 123a, 123b and first and second RF sections 124a, 124b, respectively. The first and second transmit sections TS1, TS2 provide a time domain RF signal proportional to preamble information, signal information and input data for transmission by the first and second transmit antennas T1, T2, respectively.

The first and second receive antennas R1, R2 receive the transmission and provide it to the first and second receive sections RS1, RS2, which include first and second RF sections 131a, 131b, first and second analog to digital converters (ADCs) 132a, 132b, first and second filters 133a, 133b, and first and second Fast Fourier Transform (FFT) sections 134a, 134b, respectively. The first and second receive sections RS1, RS2 provide a frequency domain digital signal, proportional to the preamble information, signal information and input data, to the receive decoding system 135. The receive decoding system 135 includes a subchannel demodulator 136, a channel estimator 137 and a decoder 138 that employ the preamble information, signal information and input data to provide the output data. In the illustrated embodiment, the channel estimator 137 employs the preamble information for the purpose of estimating the communications channel.

In a MIMO transmission, two training sequences (i.e., IEEE 802.11(a) long sequences) may be employed as part of a preamble transmission by each of the first and second transmit sections TS1, TS2 to establish an estimate of the communication channel. As indicated earlier, this channel estimate is needed at the receiver to reliably re-establish first and second independent transmit signals $X1(k)$, $X2(k)$ wherein first and second receive signals $Y1(k)$, $Y2(k)$ may be written as:

$$Y1(k)=H11(k)*X1(k)+H12(k)*X2(k) \qquad (1a)$$

$$Y2(k)=H21(k)*X1(k)+H22(k)*X2(k) \qquad (1b)$$

where, $Hij(k)$ denotes the unknown channels from the $j^{th}$ transmit antenna to the $i^{th}$ receive antenna. As before, k is the sub-carrier/tone index, and the associated noise terms have been assumed negligible here, for simplicity.

In the illustrated embodiment of the present invention, the time-switched preamble generator 115 employs the initial preamble formatter 116 to provide a first preamble to the first transmit antenna T1 and a second preamble to the second transmit antenna T2 for concurrent transmission during an initial time interval. Additionally, the subsequent preamble formatter 117, which is coupled to the initial preamble formatter 116, provides the second preamble to the first transmit antenna T1 and the first preamble to the second transmit antenna T2 for concurrent transmission during a subsequent time interval. Often, the initial and subsequent time intervals are contiguous, but they may be otherwise employed as advantageous to a particular application.

In one embodiment of the present invention, a training sequence (i.e., an IEEE 802.11 (a) long sequence) is employed as the first preamble to the first transmit antenna T1, and a null is employed as the second preamble to the second transmit antenna T2, wherein the preambles occur during the initial time interval. Then, the first and second preambles are interchanged between the first and second transmit antennas T1, T2 for concurrent transmission during the subsequent time interval. As will be further discussed with respect to FIG. 2, the null may be provided as a transmission employing a null sequence or a zero function as well as an un-modulated transmission thereby allowing a more straight-forward determination of the individual channel coefficients.

In an alternative embodiment, the first preamble to the first transmit antenna T1 employs a first training sequence and the second preamble employs a second training sequence that is orthogonal to the first training sequence. As will be further discussed with respect to FIG. 3, this orthogonal relationship, provided by the sub-carrier/tone indices, also allows a more straight-forward determination of the individual channel coefficients. Of course, guard intervals may be employed with the training sequences indicated above to reduce pass band filter effects.

Those skilled in the art will understand that the present invention can be applied to other conventional and future-discovered MIMO communication systems. These systems may form a part of a selected one of a narrowband wireless communication system employing multiple antennas, a broadband communication system employing time division multiple access (TDMA) or a general multiuser communication system.

Figure 2:
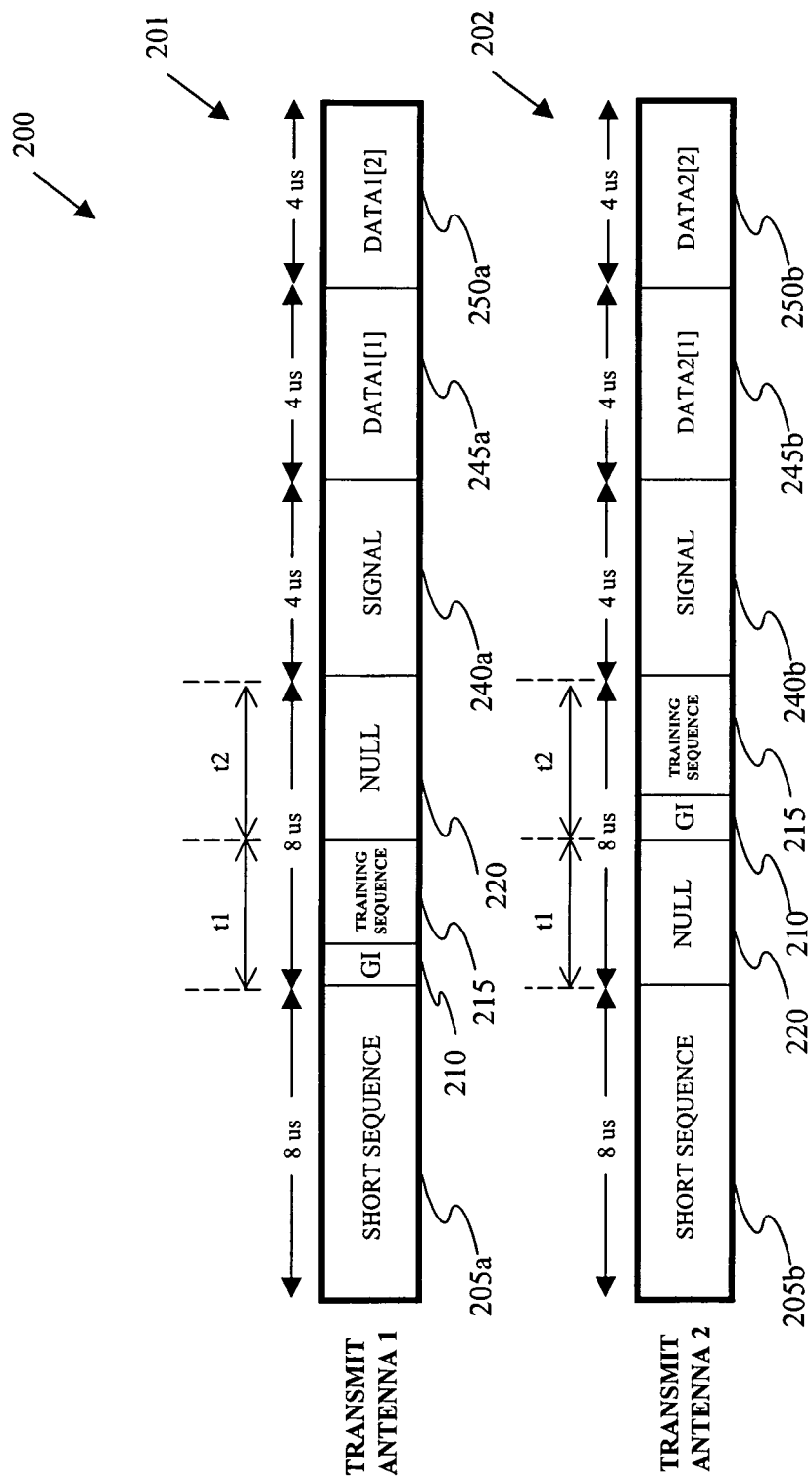
FIG. 2 illustrates a diagram of an embodiment of a transmission frame format employable with a time-switched preamble generator and constructed in accordance with the principles of the present invention.

Turning now to FIG. 2, illustrated is a diagram of an embodiment of a transmission frame format, generally designated 200, employable with a time-switched preamble generator and constructed in accordance with the principles of the present invention. The transmission frame format 200 may be employed with first and second MIMO transmitters as discussed with respect to FIG. 1 and includes first and second transmission frames 201, 202 associated with first and second MIMO transmit antennas, respectively.

The first and second transmission frames 201, 202 employ several standard fields that are common to both such as standard short sequence fields 205a, 205b, standard signal fields 240a, 240b, and portions of a transmit payload containing data fields 245a, 245b, 250a, 250b, respectively. During an initial time interval t1, the first transmission frame 201 includes a guard interval 210 and a training sequence 215 that form a first preamble, and the second transmission frame 202 includes a null 220 that forms a second preamble. During a subsequent time interval t2, the preambles are interchanged such that the first transmission frame 201 includes the null 220 and the second transmission frame 202 includes the guard interval 210 and the training sequence 215, as shown.

With reference to FIG. 1 for the illustrated embodiment of FIG. 2 and during the initial time interval t1, the first and second receive signals $Y1i(k)$, $Y2i(k)$ on the first and second receive antennas R1, R2 for the $k^{th}$ sub-carrier/tone index may be written as:

$$Y1i(k)=H11(k)*X1(k)+H12(k)*N2i(k) \quad (2a)$$

$$Y2i(k)=H21(k)*X1(k)+H22(k)*N2i(k) \quad (2b)$$

where an initial null $N2i(k)$ is used in the equations (2a), (2b) to characterize the null 220 during the initial time interval t1.

The first independent transmit signal $X1(k)$ represents the training sequence 215 provided to the first transmit antenna T1 while the initial null 220 is provided to the second transmit antenna T2.

Similarly, during the subsequent time interval t2, the first and second receive signals $Y1s(k)$, $Y2s(k)$ on the first and second receive antennas R1, R2 for the $k^{th}$ sub-carrier/tone index may be written as:

$$Y1s(k)=H11(k)*N1s(k)+H12(k)*X2(k) \quad (2c)$$

$$Y2s(k)=H21(k)*N1s(k)+H22(k)*X2(k) \quad (2d)$$

where a subsequent null $N1s(k)$ is used in the equations (2c), (2d) to characterize the null 220 during the subsequent time interval t2. The second independent transmit signal $X2(k)$ represents the training sequence 215 provided to the second transmit antenna T2 while the subsequent null $N1s(k)$ is provided to the first transmit antenna T1.

The influence of the exemplary initial and subsequent nulls $N2i(k)$, $N1s(k)$ may be neglected in the process of communication channel estimation. Then, equations (2a), (2b), (2c) and (2d) simplify to:

$$Y1i(k)=H11(k)*X1(k) \quad (3a)$$

$$Y2i(k)=H21(k)*X1(k) \quad (3b)$$

$$Y1s(k)=H12(k)*X2(k) \quad (3c)$$

$$Y2s(k)=H22(k)*X2(k) \quad (3d)$$

which yields the needed individual channel coefficients $H11(k)$ and $H12(k)$ directly from the initial time interval t1, and the individual channel coefficients $H21(k)$ and $H22(k)$ directly from the subsequent time interval t2.

The initial and subsequent nulls $N2i(k)$, $N1s(k)$ may be null sequences of numerical values that converge to zero. Alternatively, the initial and subsequent nulls $N2i(k)$, $N1s(k)$ may be zero functions, which by definition are zero almost everywhere. Additionally, the initial and subsequent nulls $N2i(k)$, $N1s(k)$ may be an un-modulated transmission or one employing substantially zero modulation. Typically, the initial and subsequent nulls $N2i(k)$, $N1s(k)$ employ the same null format. Of course, the null format of each of the initial and subsequent nulls $N2i(k)$, $N1s(k)$ may differ, as advantageously required by a particular application.

As may be seen in FIG. 2, the initial time interval t1 and the subsequent time interval t2 are contiguous. However, alternative embodiments provide separation of the initial time interval t1 and the subsequent time interval t2 as appropriate to a particular application. Although the transmission frame format 200 typically does not maintain backward compatibility with IEEE 802.11(a) compliant transmitters, its use does not increase transmission overhead and, therefore, does not decrease transmission throughput.

Figure 3:
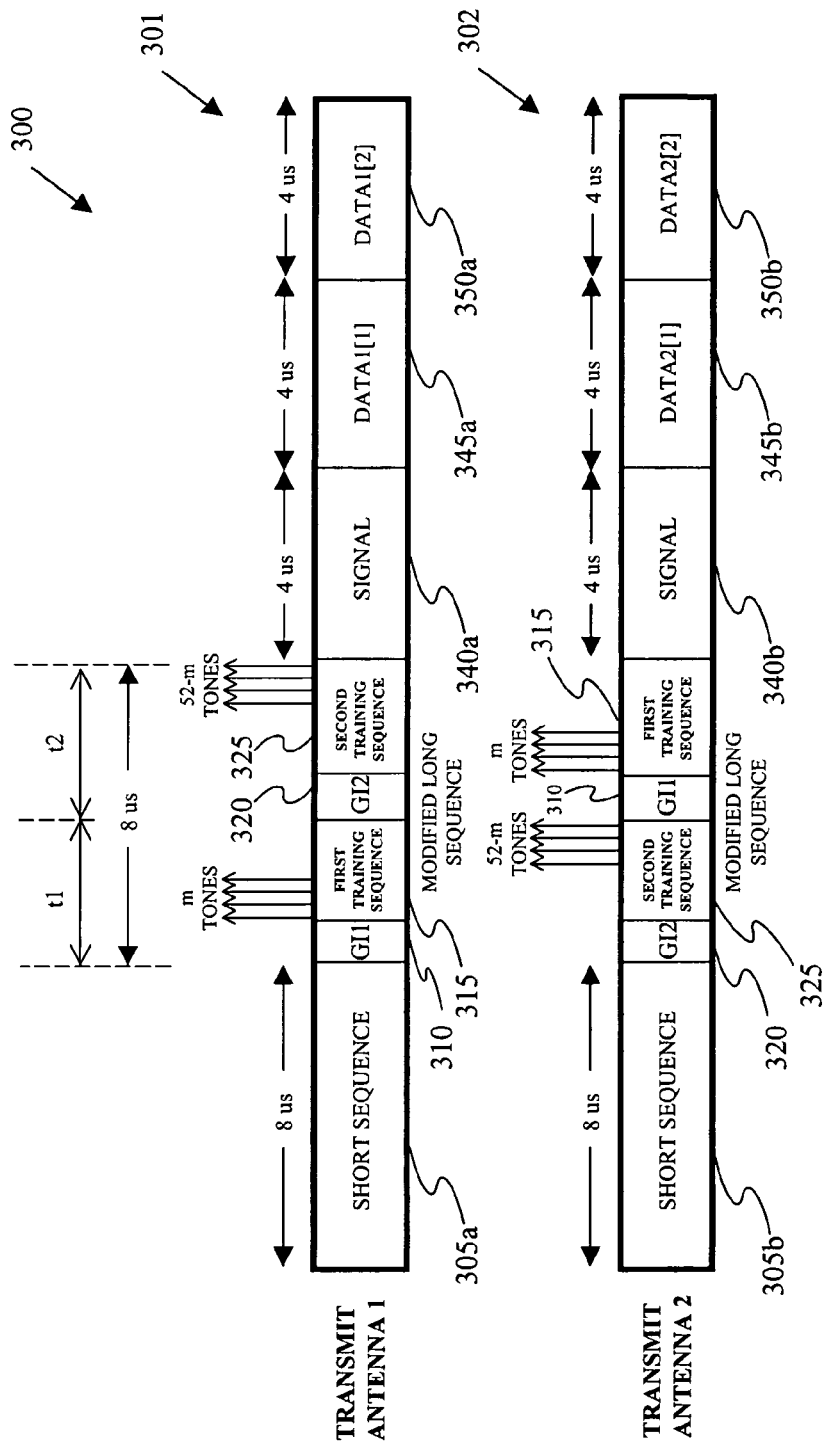
FIG. 3 illustrates a diagram of an alternative embodiment of a transmission frame format employable with a time-switched preamble generator and constructed in accordance with the principles of the present invention.

Turning now to FIG. 3, illustrated is a diagram of an alternative embodiment of a transmission frame format, generally designated 300, employable with a time-switched preamble generator and constructed in accordance with the principles of the present invention. The transmission frame format 300 may be employed with first and second MIMO transmitters as discussed with respect to FIG. 1 and includes first and second transmission frames 301, 302 associated with first and second MIMO transmit antennas, respectively.

The first and second transmission frames 301, 302 employ several standard fields that are common to both such as standard short sequence fields 305a, 305b, standard signal fields 340a, 340b, and portions of a transmit payload containing data fields 345a, 345b, 350a, 350b, respectively. During an initial time interval t1, the first transmission frame 301 includes a first guard interval 310 and a first training sequence 315 that form a first preamble, and the second transmission frame 302 includes a second guard interval 320 and a second training sequence 325 that form a second preamble. During a subsequent time interval t2, the two preambles are interchanged such that the first transmission frame 301 includes the second guard interval 320 and the second training sequence 325 and the second transmission frame 302 includes the first guard interval 310 and the first training sequence 315, as shown.

The first training sequence 315 is orthogonal to the second training sequence 325. The first and second long sequences 315, 325 may provide up to 52 tones identified by a sub-carrier/tone index k. In the illustrated embodiment and during the initial time interval t1, the first training sequence 315 provides a number of tones (e.g., m tones) with tone index k1 during a time when the second training sequence 325 does not provide tones at tone index k1. Then, the second training sequence 325 provides a remaining number of tones (e.g., 52–m tones, where 52 tones are employed) with a tone index k2 during a time when the first training sequence 315 does not provide tones at tone index k2. A particular tone index k may be represented by either k1 or k2, but not both. During the subsequent time interval t2, the first and second preambles are interchanged and the orthogonal tone sequences are repeated, as before.

With reference to FIG. 1 for the illustrated embodiment of FIG. 3, recall that the first and second receive signals $Y1(k)$, $Y2(k)$ on the first and second receive antennas R1, R2 for the $k^{th}$ sub-carrier/tone index may be written generally as:

$$Y1(k)=H11(k)*X1(k)+H12(k)*X2(k) \quad (1a)$$

$$Y2(k)=H21(k)*X1(k)+H22(k)*X2(k) \quad (1b)$$

where the first independent transmit signal $X1(k)$ represents the first training sequence 315 provided to the first transmit antenna T1, and the second independent transmit signal $X2(k)$ represents the second training sequence 325 provided to the second transmit antenna T2.

Since the first and second training sequences provide tones that are orthogonal, the first and second independent transmit signals $X1(k)$, $X2(k)$ occur at different times, and equations (1a), (1b) simplify to:

$$Y1a(k)=H11(k1)*X1(k1)+H12(k2)*X2(k2) \quad (4a)$$

$$Y2a(k)=H21(k1)*X1(k1)+H22(k2)*X2(k2) \quad (4b)$$

$$Y1b(k)=H11(k2)*X1(k2)+H12(k1)*X2(k1) \quad (4c)$$

$$Y2b(k)=H21(k2)*X1(k2)+H22(k1)*X2(k1) \quad (4d)$$

where $Y1a(k)$, $Y2a(k)$ correspond to the first and second receive signals during the initial interval t1, $Y1b(k)$, $Y2b(k)$ correspond to the first and second receive signals during the subsequent time interval t2, and k1, k2 denote the tone indices of energized tones in the first and second preambles, respectively. By properly combining the complementary receive signals, the needed individual channel coefficients $H11(k)$, $H12(k)$, $H21(k)$ and $H22(k)$ may be determined for all values of k.

Figure 4:
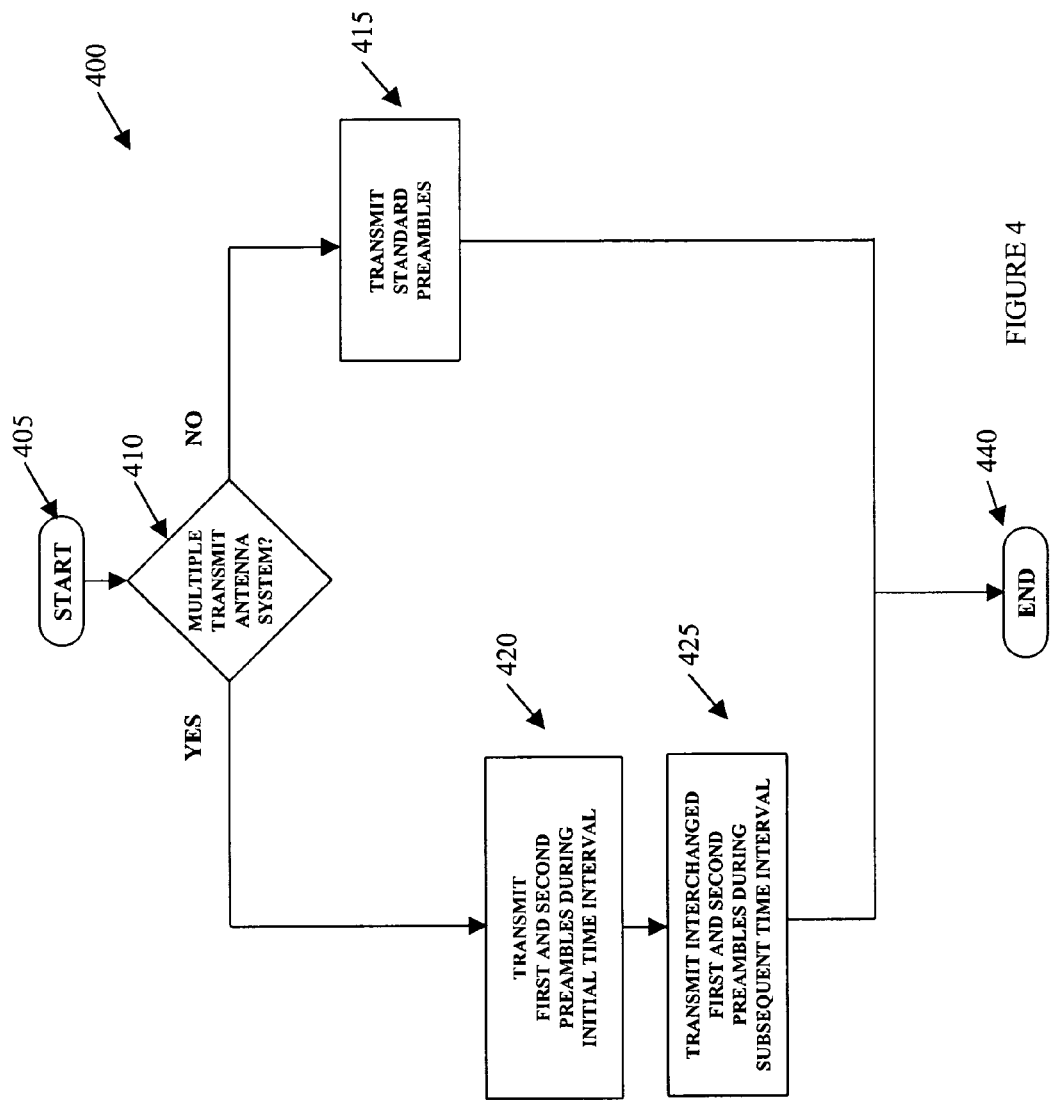
FIG. 4 illustrates a flow diagram of an embodiment of a method of generating a time-switched preamble carried out in accordance with the principles of the present invention.

Turning now to FIG. 4, illustrated is a flow diagram of an embodiment of a method of generating a time-switched preamble, generally designated 400, carried out in accordance with the principles of the present invention. The method 400 may be employed with a MIMO transmitter having a plurality of transmit antennas and starts in a step 405 with a current transmission. A decisional step 410 determines if multiple transmit antennas are being employed for the current transmission. If multiple transmit antennas are not being employed, a standard preamble is transmitted in a step 415 and the method 400 ends in a step 430.

If multiple transmit antennas are being employed, the first and second preambles are transmitted employing first and second transmit antennas in a step 420. In one embodiment, the first preamble, for the first transmit antenna, employs a training sequence having a guard interval, and the first preamble, for the second transmit antenna, employs an initial null during an initial time interval in a step 420. Then, in a step 425, the second preamble, for the first transmit antenna, employs a subsequent null, and the second preamble, for the second transmit antenna, employs the training sequence and guard interval during a subsequent time interval. In this embodiment, the first set of preambles for each transmit antenna are transmitted in the step 420, and the second set of preambles are transmitted in the step 425.

In an alternative embodiment, the preamble for the first transmit antenna employs a first training sequence, and the preamble for the second transmit antenna employs a second training sequence that is orthogonal to the first training sequence. As before, the training sequences along with their associated guard intervals are transmitted employing first and second transmit antennas, respectively, during the initial time interval in the step 420. Then, the training sequences and associated guard intervals are interchanged and transmitted over second and first transmit antennas, respectively, in the step 425. In each of these embodiments, the initial time interval is contiguous with the subsequent time interval, and the method 400 again ends in the step 430.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

In summary, embodiments of the present invention employing a time-switched preamble generator and a method of generating a time-switched preamble have been presented. The embodiments discussed employ first and second preambles, which are interchanged between initial and subsequent time intervals. These preambles may employ either a training sequence and a null or two orthogonal training sequences. Advantages include transmissions without an increase in transmission overhead thereby allowing a transmission throughput without degradation. Additionally, individual channel coefficients are provided directly allowing a reduction in the computational complexity needed to establish a channel estimate for a MIMO receiver.

Although the present invention has been described in detail, those skilled in the art should understand that they can make various changes, substitutions and alterations herein without departing from the spirit and scope of the invention in its broadest form.

What is claimed is:

1. A time-switched preamble generator for use with a multiple-input, multiple-output (MIMO) transmitter employing first and second transmit antennas, comprising:

an initial preamble formatter configured to provide a first preamble to said first transmit antenna and a second preamble to said second transmit antenna during an initial time interval;

a subsequent preamble formatter coupled to said initial preamble formatter and configured to provide said second preamble to said first transmit antenna and said first preamble to said second transmit antenna during a subsequent time interval; and wherein at least one of said first preamble and said second preamble employs a complete training sequence.

2. The generator as recited in claim 1 wherein said first preamble employs said complete training sequence and said second preamble employs a null.

3. The generator as recited in claim 2 wherein said complete training sequence occurs during said null.

4. The generator as recited in claim 2 wherein said null is selected from the group consisting of:
 a null sequence;
 a zero function; and
 an un-modulated transmission.

5. The generator as recited in claim 1 wherein said first preamble employs a complete first training sequence and said second preamble employs a complete second training sequence orthogonal to said complete first training sequence.

6. The generator as recited in claim 5 wherein said complete first training sequence employs a subset of tones and said complete second training sequence employs a remaining subset of tones.

7. The generator as recited in claim 1 wherein at least one of said first and second preambles employs a guard interval.

8. The generator as recited in claim 1 wherein said initial and subsequent time intervals are contiguous.

9. A method of generating a time-switched preamble for use with a multiple-input, multiple-output (MIMO) transmitter employing first and second transmit antennas, comprising:
 providing a first preamble to said first transmit antenna and a second preamble to said second transmit antenna during an initial time interval;
 further providing said second preamble to said first transmit antenna and said first preamble to said second transmit antenna during a subsequent time interval; and
 wherein at least one of said first preamble and said second preamble employs a complete training sequence.

10. The method as recited in claim 9 wherein said first preamble field employs said complete training sequence and said second preamble field employs a null.

11. The method as recited in claim 10 wherein said complete training sequence occurs during said null.

12. The method as recited in claim 10 wherein said null is selected from the group consisting of:
 a null sequence;
 a zero function; and
 an un-modulated transmission.

13. The method as recited in claim 9 wherein said first preamble employs a complete first training sequence and said second preamble employs a complete second training sequence orthogonal to said complete first training sequence.

14. The method as recited in claim 13 wherein said complete first training sequence employs a subset of tones and said complete second training sequence employs a remaining subset of tones.

15. The method as recited in claim 9 wherein at least one of said first and second preambles employs a guard interval.

16. The method as recited in claim 9 wherein said initial and subsequent time intervals are contiguous.

17. A multiple-input, multiple-output (MIMO) communication system, comprising:
 first and second transmitters employing first and second transmit antennas, respectively;
 a time-switched preamble generator coupled to said first and second transmitters, including:
  an initial preamble formatter that provides a first preamble to said first transmit antenna and a second preamble to said second transmit antenna during an initial time interval,
  a subsequent preamble formatter coupled to said initial preamble formatter that provides said second preamble to said first transmit antenna and said first preamble to said second transmit antenna during a subsequent time interval; and
  wherein at least one of said first preamble and second preamble employs an undivided training sequence; and
 first and second receivers, associated with said first and second transmitters, that employ first and second receive antennas, respectively.

18. The system as recited in claim 17 wherein said first preamble employs said undivided training sequence and said second preamble employs a null.

19. The system as recited in claim 18 wherein said undivided training sequence occurs during said null.

20. The system as recited in claim 18 wherein said null is selected from the group consisting of:
 a null sequence;
 a zero function; and
 an un-modulated transmission.

21. The system as recited in claim 17 wherein said first preamble employs an undivided first training sequence and said second preamble employs an undivided second training sequence orthogonal to said undivided first training sequence.

22. The system as recited in claim 21 wherein said undivided first training sequence employs a subset of tones and said undivided second training sequence employs a remaining subset of tones.

23. The system as recited in claim 17 wherein at least one of said first and second preambles employs a guard interval.

24. The system as recited in claim 17 wherein said initial and subsequent time intervals are contiguous.

* * * * *